(12) United States Patent
Chang

(10) Patent No.: US 7,262,879 B2
(45) Date of Patent: Aug. 28, 2007

(54) METHOD FOR SCREENING OF HALFTONE IMAGES

(75) Inventor: Ching-Wei Chang, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 996 days.

(21) Appl. No.: 09/820,114

(22) Filed: Mar. 28, 2001

(65) Prior Publication Data

US 2002/0171873 A1 Nov. 21, 2002

(51) Int. Cl.
- H04N 1/405 (2006.01)
- H04N 1/407 (2006.01)
- H04N 1/409 (2006.01)
- G06K 15/00 (2006.01)

(52) U.S. Cl. .......... 358/1.9; 358/3.06; 358/3.26

(58) Field of Classification Search .......... 358/1.9, 358/3.06–3.09, 534, 3.1–3.12, 451, 536, 358/3.16, 3.21, 3.01, 3.26, 3.27; 382/275, 382/276, 284; 345/615, 596; 347/251, 144
See application file for complete search history.

(56) References Cited

U.S. PATENT DOCUMENTS

| | | | |
|---|---|---|---|
| 4,907,096 A | 3/1990 | Stansfield et al. | |
| 4,926,267 A * | 5/1990 | Shu et al. | 358/3.26 |
| 5,027,078 A | 6/1991 | Fan | |
| 5,239,390 A | 8/1993 | Tai | |
| 5,243,444 A | 9/1993 | Fan | |
| 5,339,170 A | 8/1994 | Fan | |
| 5,343,309 A | 8/1994 | Roetling | |
| 5,384,648 A | 1/1995 | Seidner et al. | |
| 5,387,985 A * | 2/1995 | Loce et al. | 358/447 |
| 5,740,279 A * | 4/1998 | Wang et al. | 382/237 |
| 5,777,757 A * | 7/1998 | Karlsson et al. | 358/3.1 |
| 5,812,742 A * | 9/1998 | Hanyu | 358/1.2 |
| 5,875,268 A * | 2/1999 | Miyake | 382/276 |
| 6,072,590 A * | 6/2000 | Sano et al. | 358/1.9 |
| 6,101,285 A | 8/2000 | Fan | |
| 6,163,629 A | 12/2000 | Cheung et al. | |
| 6,172,769 B1 * | 1/2001 | Rao et al. | 358/1.9 |
| 6,643,032 B1 * | 11/2003 | Crean et al. | 358/3.06 |

FOREIGN PATENT DOCUMENTS

| JP | 02192363 | 7/1990 |
|---|---|---|
| JP | 09284553 | 10/1997 |

\* cited by examiner

*Primary Examiner*—David Moore
*Assistant Examiner*—James A. Thompson
(74) *Attorney, Agent, or Firm*—David C. Ripma

(57) ABSTRACT

A method of making second generation halftone images lacking visible interference, includes selecting an image which has been halftoned, and determining the number of tone levels required for each pixel of the halftoned image, A halftone cell size is identified, and a dot growth pattern is arranged to offset initial dot growth from the center of the halftone cell by defining sub-cells and growing the dot pattern relative to the sub-cell, A dot pattern in a second generation halftone of the selected image is grown.

17 Claims, 4 Drawing Sheets

Fig. 1
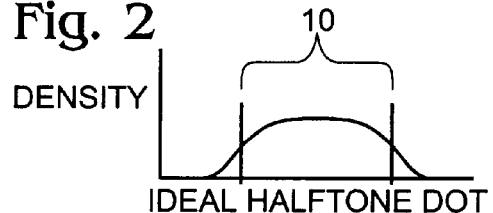
Fig. 2
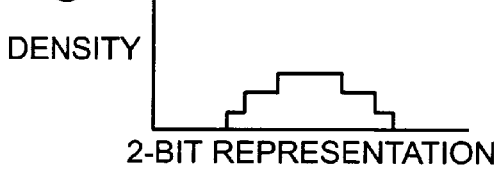
Fig. 3
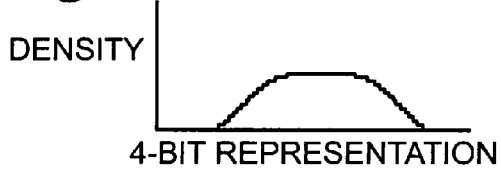
Fig. 4
Fig. 5
| 0 | 4 | 3 | 0 |
|---|---|---|---|
| 3 | 8 | 8 | 4 |
| 4 | 8 | 8 | 3 |
| 0 | 3 | 4 | 0 |
TYPICAL 4-BIT
HALFTONE DOT
Fig. 6
| 4 | 3 | 4 | 3 |
|---|---|---|---|
| 4 | 4 | 4 | 4 |
| 4 | 3 | 4 | 3 |
| 4 | 4 | 4 | 4 |
EVENLY GROWN
4-BIT DOT
Fig. 7
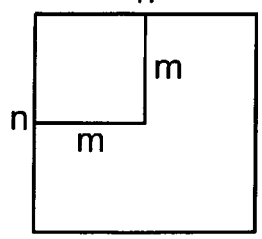

Fig. 8

| 9 | 13 | 10 | 14 |
|---|----|----|----|
| 1 | 5  | 2  | 6  |
| 12 | 16 | 11 | 15 |
| 4 | 8  | 3  | 7  |

4-BIT HALFTONE CELL ARRANGEMENT

Fig. 9

| 9 | 11 | 2 | 4 |
|---|----|---|---|
| 15| 13 | 8 | 6 |
| 1 | 3  | 10| 12|
| 7 | 5  | 16| 14|

METHOD FOR SCREENING OF HALFTONE IMAGES

FIELD OF THE INVENTION

This invention relates to screening in color reproduction systems, and specifically to rendering second generation halftone images with a multi-level halftone technique.

BACKGROUND OF THE INVENTION

It is normally difficult to render a halftone image using a second halftone process. Often, the two halftones interfere, causing a distortion in the form of a low frequency binary banding pattern, called moiré, which appears as alternating light and dark bands, or patches, in the second generation halftone image. The normal procedure to reduce or eliminate this moiré is by applying a low pass filter to the original halftone image, thus smoothing or eliminating the binary pattern. Such low pass filters may be optical or digital, and smooth or eliminate the original halftone pattern. The filtering process causes blurred edges and loss of fine details. This additional digital image process considerably slows the rendering process. Some improvements to the filtering process attempt to preserve sharp edges, however, these improvements only help to preserve hard, distinct edges and do nothing to preserve fine details.

U.S. Pat. No. 4,907,096 for Image processing, to Stansfield et al., granted Mar. 6, 1990, describes a method for processing a screened separation, which includes use of an analyzing scanner for scanning the separation at a resolution higher than the screen ruling to generate a binary value for each high resolution pixel of the separation, and uses a descreening system to which the signals from the processor are fed. The descreening system generated signals representing a descreened version of the original separation. The descreening system divides the binary representation into a number of blocks of high resolution pixels, each block constituting a low resolution pixel. The binary values in each block are summed to generate the resultant single value for the block.

U.S. Pat. No. 5,027,078 to Fan, for Unscreening of stored digital halftone images by logic filtering, granted Jun. 25, 1991, describes a method of unscreening a digitally created halftone image in order to reconstruct a continuous tone image, including the determination of the parameters of the halftone screen used to produce the halftone image, logically filtering the halftone image to determine approximate continuous tone levels, and optionally, smoothing the continuous tone levels of the reconstructed image to minimize the quantization errors introduced during the original screening or dithering process.

U.S. Pat. No. 5,239,390 for Image processing method to remove halftone screens, to Tai, granted Aug. 24, 1993, describes a method for reproducing an image which includes scanning an original image to produce a digitized image, performing a local structure analysis of the digitized image, and selectively applying a descreening filter to a region of the digitized image based on the results of the local structure analysis to remove a specific frequency of the digitized image caused by halftone screens.

U.S. Pat. No. 5,243,444 for Image processing system and method with improved reconstruction of continuous tone images from halftone images including those without a screen structure, to Fan, granted Sep. 7, 1993, describes an image processing system which converts unscreened and other halftone images to continuous tone images. Value data is sequentially generated for successive pixels of a screened or unscreened halftone image. Each image pixel is Sigma filtered with a predetermined set of filter parameters, including the filter window size and a Sigma difference range which is applied to determine which pixels in the filter window are counted in determining average window pixel values. An output continuous tone image containing the Sigma filtered pixels is generated for storage and/or processing to a halftone copy or print.

U.S. Pat. No. 5,339,170, for Image processing system and method employing hybrid filtering to provide improved reconstruction of continuous tone images from halftone screen-structured images, to Fan, granted Aug. 16, 1994, describes an image processing system which converts screen-structured halftone images to continuous tone images. Value data is sequentially generated for successive pixels of a halftone image. An averaging filter is provided for sequentially filtering each pixel in the halftone image in the horizontal image direction in accordance with a first predetermined filter to generate an intermediately filtered image. A pattern matching filter then sequentially filters each pixel in the intermediately filtered image in the vertical direction to generate a hybrid filtered image. The hybrid filter arrangement is then iteratively operated for three additional sets of orthogonal directions, i.e., the vertical and horizontal directions, a first diagonal direction and a second diagonal direction, and a combination of the second and first diagonal directions. The best hybrid image is generated as an output continuous tone image for storage and/or processing to a halftone copy or print.

U.S. Pat. No. 5,343,309 for Image processing system and method employing adaptive filtering to provide improved reconstruction of continuous tone images from halftone images including those without a screen structure, to Roetling, granted Aug. 30, 1994, describes an image processing system which converts halftone images to continuous tone images. It employs an adaptive filter, which processes successive pixels in an input halftone image. The adaptive filter employs a filter which is selected under feedback control from a plurality of filter sets, each having a plurality of filters. The halftone image is also low-pass filtered to generate a first approximation image (FAI). A spatial gradient value is computed for each pixel in the FAI. A control operates the adaptive filter to apply one of the predetermined filters to the current pixel as a function of the associated pixel spatial gradient. An output image from the adaptive filter in a first iteration of the filtering procedure may then be applied to the input of the adaptive filter for a second adaptive filtering iteration. Pixel gradients for the second iteration are computed from the image output from the first iteration. A predetermined number of iterations are performed and the image output from the last iteration is a continuous tone image for system output.

U.S. Pat. No. 5,384,648 for Apparatus and method for descreening, to Seidner et al., granted Jan. 24, 1995, describes a technique for descreening and for performing resolution changes and correction of misregistration on a color halftone image in order to produce a continuous tone color image. The apparatus includes a filter apparatus for removing screen information from the halftone image, including a plurality of different filters, each providing interpolation and screen removal functions, and a controller for selecting per-pixel of the continuous tone image and in accordance with sensed misregistration, and as a function of desired resolution changes, one of the filters for operation on a neighborhood of the pixel.

U.S. Pat. No. 6,101,285 for Filter for producing continuous tone images from halftone digital images data, to Fan, granted Aug. 8, 2000, describes a technique for processing halftone digital image data to generate a corresponding continuous tone image is disclosed, which includes a method and apparatus for filtering a halftone image in two directions, which enables images to be smoothed in the flat regions, while reducing smoothing along edges of the image and eliminating smoothing altogether in the ridges and valleys. This provides for an improvement in image quality without losing the fine details that are often lost using standard filtering techniques.

U.S. Pat. No. 6,163,629 for Method for low complexity memory inverse dithering, to Cheung et al., granted Dec. 19, 2000, describes a method and apparatus for inverse dithering a dithered image. The system includes a plurality of digital filters, which are organized in a preselected order. A selection module enables the selection of one filter from the plurality of filters according to the preselected order to filter a presently selected portion of the dithered image. The selected portion of the dithered image is then processed based upon the selected filter to generate a portion of the inverse dithered image.

SUMMARY OF THE INVENTION

A method of making second generation halftone images lacking visible interference, includes selecting an image which has been halftoned; determining the number of tone levels required for each pixel of the halftoned image; identifying a halftone cell size; arranging a dot growth pattern to offset initial dot growth from the center of the halftone cell by defining sub-cells and growing the dot pattern relative to the sub-cell; and growing a dot pattern in a second generation halftone of the selected image.

It is an object of the Invention to provide a method for reproducing a halftoned image wherein a second generation halftoned image is required.

Another object of the invention is to provide a method of making a second generation halftoned image which does not have visibly perceptible inference therein.

A further object of the invention is to provide a multi-level halftone technique.

This summary and objectives of the invention are provided to enable quick comprehension of the nature of the invention. A more thorough understanding of the invention may be obtained by reference to the following detailed description of the preferred embodiment of the invention in connection with the drawings.

BRIEF DESCRIPTION OF THE DRAWINGS

FIG. 1 is a density v. width graph of an ideal halftone dot.

FIG. 2 is a density v. width graph of a real-world halftone dot.

FIG. 3 is a density v. width graph of a halftone dot in a 2-bit halftone.

FIG. 4 is a density v. width graph of a halftone dot in a 4-bit halftone.

FIG. 5 is a dot growth pattern of a typical 4-bit halftone dot.

FIG. 6 is a dot growth pattern of a 4-bit halftone dot grown according to the method of the invention.

FIG. 7 depicts a halftone cell having a sub-cell therein.

FIG. 8 depicts a halftone cell as a 2-D matrix.

FIG. 9 depicts various input graylevels and output sub-pixel levels.

DETAILED DESCRIPTION OF THE PREFERRED EMBODIMENT

Figure 10:
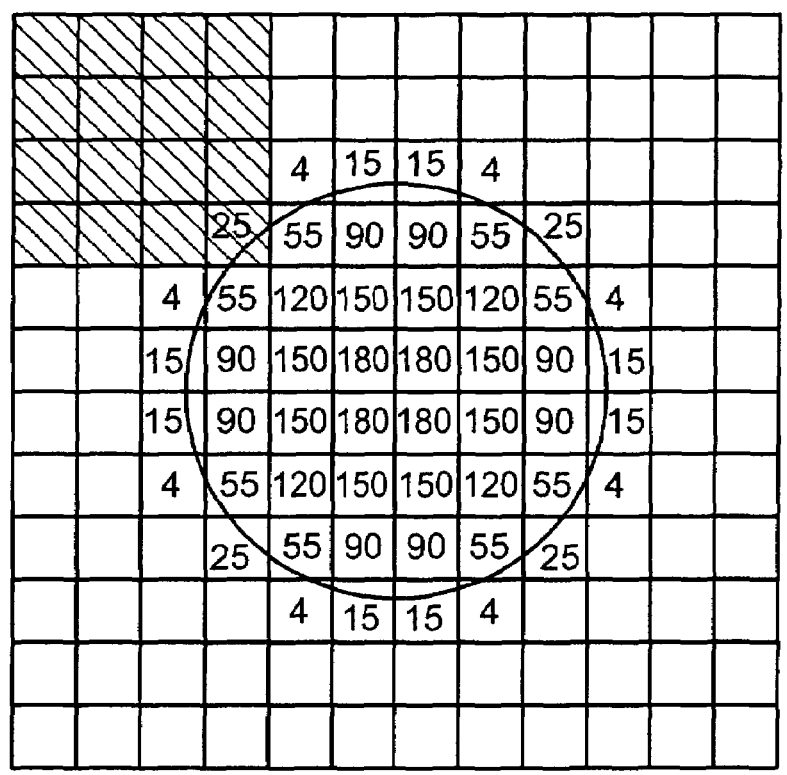
FIG. 10 depicts a 4×4 halftone matrix.

The present invention uses a multi-level screening process which preserves the original halftone structure without introducing distortion, or moiré, into a resultant, second generation halftone image. The method of the invention does not destroy or blur the halftone pattern; it preserves the original halftone dots by using multi-level tone reproduction, instead of rendering the halftone image by another screen pattern which will likely introduce a second screen pattern. This method renders the original halftone image without introducing any interference pattern, or moire, from the second screen pattern, which normally interferes with the original screen pattern.

Theoretically, a halftone image is represented by bi-tonal pixels, i.e., the pixel is either inked, with CMYK ink, or not inked. FIG. 1 shows an ideal halftone dot on paper. A single dot may be comprised of several pixels. However, the ink spread which occurs on virtually all print media, and the printing process, degrade halftone dots away from bi-tonal. There are several causes of dot spread. In the case on an inkjet device, the liquid ink will spread on the media before drying. In the case of a laser device, the heat used to fuse the toner to the media will liquify the ink and cause the ink to spread. In both ink-jet and laser devices, pressure from rollers in the device may cause further spreading. FIG. 2 shows a normal halftone dot on the paper. The halftone dot of FIG. 2 is larger, but less dense than that of FIG. 1, as indicated by the larger breadth and lower height of the trace. Because ink spreading contains a great degree of randomness, the bi-tonal reproduction, with a single threshold, is not able to recover the tone smoothness of the original image. Lines 10 in FIG. 2 represent a single threshold applied to the dot to make a bi-tonal reproduction of the halftone dot. The single threshold technique will make the resultant, second generation halftone dot either too large, or too small, with reduced density, compared to the original halftone dot. In any given area of a halftone image, many dots are present, all of which have spread, randomly. Such random spreading represents noise in both the shape and size of any halftone dot. Any attempt to return the halftone dot to its intended size and shape will also require a correction in dot density. The second generation bi-tonal halftone will recover all of the inked pixels to the maximum density. If a cut-off density is not set, the image density will significantly increase because the dot has spread. However, as dot spread is random, if only a single threshold value is used to reduce the size to compensate for the density increase due to dot spread, then both the dot size and the dot density of a single halftone dot will vary. The resulting image will appear noisy and grainy.

Ideally, an 8-bit multi-level representation can directly reproduce the scanned 8-bit separation images, however, the scanning noise is usually amplified greatly by most multi-level printing processes, and results in a noisy output image. Therefore, the halftoning process is still required to smooth the image. Traditional halftoning uses N×N pixel halftone cells to reproduce local-averaged tone scales. It forces the dots "on" in order from the halftone center to the outer edge, with a smooth halftone dot shape. This process smoothes out the random noises because the discrimination of the different threshold levels for different pixel positions in the halftone cell averages the scanning noises. Unfortunately, this process produces an addition screen pattern, and usually causes the moire if any original screen pattern remains.

In the method of the invention, multi-level halftoning provides a "soft screening", that averages the scanning noises without reconstructing new halftone centers. The details are described as following:

Determine the number of tone levels required in a pixel. A continuous tone image pixel requires 256 graylevels to provide an accurate representation, however, a halftone image pixel does not require the full 256 graylevels. If, however, there are not enough graylevels, the original halftone dots will not be accurately reproduced. FIG. 3 depicts a halftone dot represented by a 2-bit halftone, while FIG. 4 depicts a halftone dot the represented by a 4-bit halftone, for a large, e.g., 30×30 pixels. Normally, a 150 line-per-inch (lpi) halftone dot scanned and printed in 600 dpi will be about 6×6 pixels. In the case of a halftone dot having approximately 6×6 pixels, the 4-bit representation will not be as good as indicated in FIG. 4, however, FIG. 4 still provides a representation of a tone reproduction capability.

Select a halftone cell size. For example, for 4-bit halftoning, each pixel may display 15 levels of gray; therefore, an N×N sized halftone cell is able to display K amount of graylevels, where K=N×N×15. For good printing quality, a halftone dot should be able to display 255 graylevels, at least be able to display a number of graylevels close to 255.

Arrange the dot growth pattern. If the dot growth pattern begins in the center of the halftone cell, a screen pattern will be visible. If any periodic dot centers can be visually sensed, the screen pattern will also be visible. The method of the invention provides a technique for avoiding the dot centers by growing the halftone dots evenly over the entire halftone cell. "Evenly" means that, in a tint area for any input graylevel, the maximum sub-pixel level difference among all pixels is 1. FIG. 5 depicts a typical 4×4-bit halftone dot which has a maximum sub-pixel level difference of 8. FIG. 6 depicts an example of an evenly grown dot with the same total-graylevel, wherein the maximum sub-pixel level difference is only 1. The Human Visual System (HVS) cannot sense 1/15 of density difference for, e.g., a 600 dpi pixel. Therefore, the HVS will not sense a dot center which is less than or equal to 1/15 of a density difference for most printed materials.

The detail of the arrangement is that for an N×N halftone cell, the halftone cell is further divided into m×m sized sub-cells in which n=m*i, where i is an integer, as shown in FIG. 7. All pixels still have their own unique threshold value, however, the dot growth sequence is evenly distributed among the sub-cells. Therefore, no new visible screen pattern is perceptible. The Tone Reproduction Curve (TRC) of this sample has not been adjusted.

The preferred embodiment of the method of the invention includes use of a 4-bit halftone with 4×4 halftone cells. This arrangement provides 15 graylevels (1-15) plus white (0) for each pixel, and is adequate for reproducing scanned halftone dots. In electrophotography printing, pulse-width modulation provides a different signal width for different sub-pixel levels. However, after the toner development process, the ink is melted and spreads to cover nearly the whole pixel. Therefore, each pixel on the paper appears different in density, rather than in the width. The sub-cells have a size of 2×2 pixels. One example of this halftone cell arrangement is shown in FIG. 8. This is a 2-D matrix halftone cell.

Normally, a halftone matrix indicates the dot growth pattern, and directly or indirectly provides the threshold values for each position. "Indirectly" means that the matrix values need to be scaled up to the tone range, e.g., the matrix range 0 and 1 is scaled up to 0 and 255; or a "look-up" a TRC table may be used. However, the numbers in Table 1 are the index numbers that lead to the threshold lookup tables.

TABLE 1

| | Threshold Table Element Number | | | | | | | | | | | | | | | |
|---|---|---|---|---|---|---|---|---|---|---|---|---|---|---|---|---|
| Index | 1 | 2 | 3 | 4 | 5 | 6 | 7 | 8 | 9 | 10 | 11 | 12 | 13 | 14 | 15 | 16 |
| 1 | 0 | 1 | 17 | 33 | 49 | 65 | 81 | 97 | 113 | 129 | 145 | 161 | 177 | 193 | 209 | 225 |
| 2 | 0 | 2 | 18 | 34 | 50 | 66 | 82 | 98 | 114 | 130 | 146 | 162 | 178 | 194 | 210 | 226 |
| 3 | 0 | 3 | 19 | 35 | 51 | 67 | 83 | 99 | 115 | 131 | 147 | 163 | 179 | 195 | 211 | 227 |
| . | | | | | | | | | | | | | | | | |
| 15 | 0 | 15 | 32 | 48 | 64 | 80 | 96 | 112 | 128 | 144 | 160 | 176 | 192 | 208 | 224 | 240 |

Table 1 shows tables for indexes 1-3 and 15; tables for indexes 4-14 are not shown. Table values are based on the index number. The second value in the table is always the same as the index number. The following values are always 16 greater than the value before. If the input graylevel is equal to or greater than the threshold table value of the current halftone cell position, the output pixel should be turned on up to that sub-pixel level. The sub-pixel level is the index number in the table (0 to 15), e.g., in index table 1 "49" is the 5th element and its index number is 4. Therefore, four sub-pixel levels should be on.

FIG. 9 depicts examples in which numbers outside the halftone cell indicate the input graylevels and numbers inside the cell indicate the output sub-pixel levels. The last example has a 45-degree edge that one side input level is 16 and the other side level is 112.

FIGS. 10-13 depicts examples of how a halftone dot is mapped by the 4×4 halftone matrix. Assuming a scanned halftone dot has the graylevels as shown in FIG. 10, i.e., the halftone cell is within the circular boundary, the halftone matrix mapping begins at the upper-left corner, as shown by the hatched area, and then moves the halftone matrix window over all of the dot-image. This mapping is based on Threshold Table 1. This dot-image is a typical halftone round dot, and is about 65% gray for a 150 lpi screen for an image scanned in 600 dpi.

Figure 11:
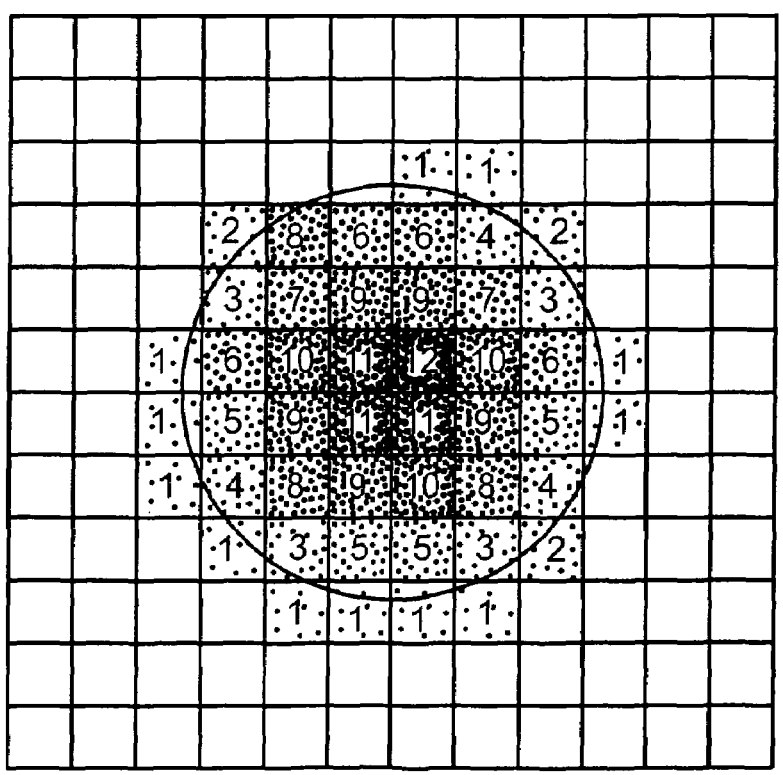
FIG. 11 depicts the result of halftoning the matrix of FIG. 8 by the method of the invention.
Figures 12, 13:
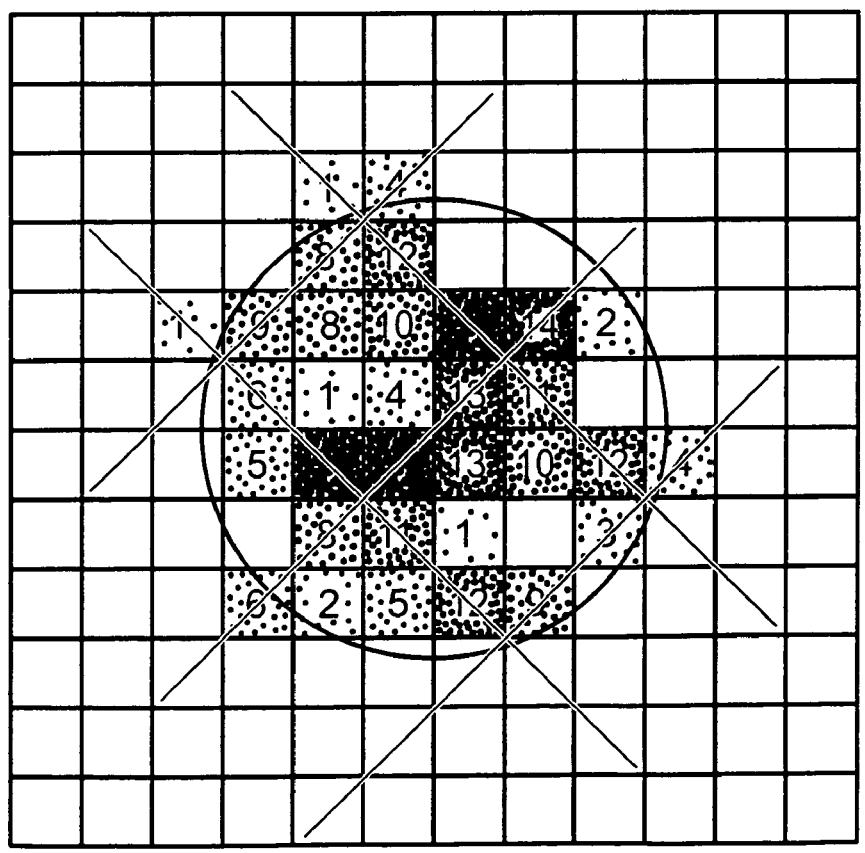
FIG. 12 depicts a 4×4 halftone matrix.
FIG. 13 depicts the result of halftoning the matrix of FIG. 12 by the method of the invention.

FIG. 11 is the resultant halftoned dot by the matrix of FIG. 8, and the method of the invention. FIG. 13 is the result of a halftoned dot by the matrix of FIG. 12 by a 4-bit halftone method. This matrix is for a "double-dot 45-degree" screen; therefore, the output shows a screen pattern as the diagonal lines.

Thus, a method for screening of halftoned images has been disclosed. It will be appreciated that further variations and modifications thereof may be made within the scope of the invention as defined in the appended claims.

I claim:

1. A method of making second generation halftone images lacking visible interference, comprising:
    selecting an image which has been halftoned by forming original halftone dots, wherein each halftone dot includes at least one pixel therefor;
    determining a number of tone levels required for each pixel of the selected halftoned image;
    arranging the number of tone levels in a set of tone levels;
    identifying a high-frequency halftone cell size;
    scanning the selected halftoned image to produce a second generation multi-level halftoned image, which retains the original halftone dots and pixels therein;
    reproducing, for each pixel in the second generation multi-level halftoned image, a pixel tone level;
    selecting, from the set of tone levels, a tone level closest to the pixel tone level of each pixel in the second generation multi-level halftoned image to minimize noise generated during scanning without constructing a new halftone center;
    arranging a dot growth pattern evenly across the second generation multi-level halftoned image.

2. The method of claim 1 which further includes determining a sub-pixel level difference.

3. The method of claim 2 wherein said growing includes growing the dot pattern evenly across the second generation multi-level image by setting the sub-pixel level difference to one.

4. The method of claim 2 wherein said defining a sub-cell includes defining a cell to be a 4×4 pixel matrix, and defining a sub-cell to be a 2×2 pixel 2D matrix, having a sub-pixel level difference matrix values for each pixel in the cell and sub-cell.

5. The method of claim 4 wherein said arranging includes scaling up the matrix values from zero to one, to zero to 255.

6. The method of claim 1 wherein the number of tone levels is fifteen levels of gray plus white.

7. The method of claim 1 wherein the cell size is 4×4 pixels.

8. A method of making second generation multi-level halftone images lacking visible interference, comprising:
    selecting an image which has been halftoned by forming original halftone dots, wherein each halftone dot includes at least one pixel therefor;
    determining a number of tone levels required for each pixel of the selected halftoned image;
    arranging the number of tone levels in a set of tone levels;
    identifying a high-frequency halftone cell size;
    scanning the selected halftoned image to produce a second generation multi-level halftoned image, which retains the original halftone dots and pixels therein;
    reproducing, for each pixel in the second generation multi-level halftoned image, a pixel tone level;
    selecting, from the set of tone levels, a tone level closest to the pixel tone level of each pixel in the second generation multi-level halftoned image to minimize noise generated during scanning without constructing a new halftone center;
    arranging a dot growth pattern to offset initial dot growth from the center of the halftone cell by defining sub-cells and growing the dot pattern relative to the sub-cell;
    determining a sub-pixel level difference; and growing a dot pattern evenly across the second generation multi-level halftoned image by setting the sub-pixel level difference to one while preserving halftone dot original amplitude.

9. The method of claim 8 wherein the number of tone levels is fifteen levels of gray plus white.

10. The method of claim 8 wherein the cell size is 4×4 pixels.

11. The method of claim 8 wherein said defining a sub-cell includes defining a cell to be a 4×4 pixel matrix, and defining a sub-cell to be a 2×2 pixel 2D matrix, having a sub-pixel level difference matrix values for each pixel in the cell and sub-cell.

12. The method of claim 11 wherein said arranging includes scaling up the matrix values from zero to one, to zero to 255.

13. A method of making second generation multi-level halftone images lacking visible interference, comprising:
    selecting an image which has been halftoned by forming original halftone dots, wherein each halftone dot includes at least one pixel therefor;
    determining a number of tone levels required for each pixel of the selected halftoned image;
    arranging the number of tone levels in a set of tone levels;
    identifying a high-frequency halftone cell size;
    scanning the selected halftoned image to produce a second generation multi-level halftoned image, which retains the original halftone dots and pixels therein;
    reproducing, for each pixel in the second generation multi-level halftoned image, a pixel tone level by setting multi-level thresholds;
    selecting, from the set of tone levels, a tone level closest to the pixel tone level of each pixel in the second generation multi-level halftoned image to minimize noise generated during scanning without constructing a new halftone center;
    arranging a dot growth pattern to offset initial dot growth from the center of the halftone cell by defining sub-cells and growing the dot pattern relative to the sub-cell;
    determining a sub-pixel level difference; and
    growing a dot pattern evenly across the second generation multi-level halftoned image by setting the sub-pixel level difference to one while preserving original dot amplitude.

14. The method of claim 13 wherein the number of tone levels is fifteen levels of gray plus white.

15. The method of claim 13 wherein the cell size is 4×4 pixels.

16. The method of claim 13 wherein said defining a sub-cell includes defining a cell to be a 4×4 pixel matrix, and defining a sub-cell to be a 2×2 pixel 2D matrix, having a sub-pixel level difference matrix values for each pixel in the cell and sub-cell.

17. The method of claim 16 wherein said arranging includes scaling up the matrix values from zero to one, to zero to 255.

* * * * *